United States Patent Office 3,833,657
Patented Sept. 3, 1974

3,833,657
SYNTHESIS OF 2-METHOXYTROPONES
David H. Evans, Cambridge, and Richard B. Greenwald, Framingham, Mass., assignors to Polaroid Corporation, Cambridge, Mass.
No Drawing. Filed May 30, 1972, Ser. No. 258,056
Int. Cl. C07c 45/00
U.S. Cl. 260—586 M          1 Claim

ABSTRACT OF THE DISCLOSURE

This invention relates to an improved method of synthesizing 2-methoxytropones in high yields by reacting a 2-hydroxytropone with dimethyl sulfate in the presence of potassium carbonate.

BACKGROUND OF THE INVENTION (1) Field of the Invention

This invention relates to an improved method of preparing the methyl ether of tropolones, i.e., 2-methoxytropones.

(2) Description of the Prior Art

Alkyl ethers of tropolone have been shown to be intermediates of considerable synthetic utility. As discussed by D. Lloyd, "Carbocyclic Non-Benzenoid Aromatic Compounds," Elsevier (Amsterdam, 1966), p. 137, 2-methoxytropones react with ammonia to give 2-aminotropone; with hydrazine to give 2-hydrazinotropone; and with various anionoid reagents such as acetoacetic ester or malonic ester to give heterocyclic analogues of azulene.

A variety of procedures employing acidic or basic catalysis have been reported for the preparation of these alkyl ethers from tropolone. For example, such ethers have been synthesized in poor yield by treating a tropolone compound with an alkyl sulfate and alkali and by treating with an alcoholic hydrogen chloride solution, the latter reagent producing the hydrochloride salt of the tropolone alkyl ether. The product yield and purity is, however, considerably less than the essentially quantitative conversion achieved with a diazoalkane, e.g., diazomethane under neutral conditions. This fact is not surprising since the lability of these vinylogous β-diketo enol ethers is well known (D. Lloyd, ibid, p. 121).

The present invention is concerned with the O-methylation of tropolone and provides a facile and high yield synthesis of tropolone methyl ethers which obviates the use of diazomethane, a poisonous gas at ambient temperatures, and thus, is ideally suited for large scale preparations.

SUMMARY OF THE INVENTION

It is, therefore, the primary object of the present invention to provide an improved synthesis for the preparation of 2-methoxytropones.

Other objects of this invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claim.

DESCRIPTION OF THE PREFERRED EMBODIMENTS

According to the present invention, it has been found that the conversion of tropolones to their methyl ethers may be accomplished by simply refluxing the tropolone with dimethyl sulfate in an inert organic solvent in the presence of potassium carbonate. As an illustration, the preparation of the methyl ether of tropolone is set forth below.

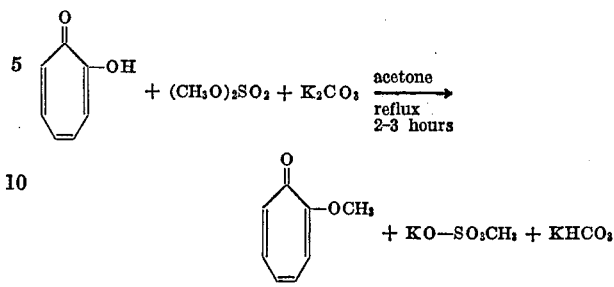

Although this procedure has been used often in the phenolic series, it does not seem to have been applied previously to tropolones. M. Pailer and P. Bergthaller, Monatsh., 99, p. 103 (1968), however, have shown that esterification of carboxylic acids occurs in high yield under these conditions. Though tropolone has been regarded as an "extended acid" so that conversion of tropolone to its alkyl ethers may be considered analogous to an esterification reaction, it has been found that tropolones do not always behave in the same manner as carboxylic acids. For example, it has been found that the procedures for esterification of carboxylic acids with boron trifluoride etherate as catalyst reported by P. K. Kadaba, Synthesis, p. 316 (1971) fails completely in the case of tropolone.

In the present method, it has been found that substantially quantitative yields of 2-methoxytropones may be obtained using dimethyl sulfate as the methylating agent in the presence of the potassium carbonate catalyst. Besides excellent yields, dimethyl sulfate is relatively high boiling in comparison to other methylating agents and thus, is considerably less hazardous for use in large-scale preparations.

The tropolone starting material may be substituted, for example, with alkyl, aryl, alkaryl, halo, or other groups or with a fused ring or rings as may be desired in the final product. Preferably, the tropolone starting material, the potassium carbonate and the dimethyl sulfate are employed in the present method in substantially equimolar proportions.

The solvent employed may be any inert organic liquid, for example, acetone, 2-butanone, tetrahydrofuran, N,N'-dimethylformamide and dimethylsulfone.

Examples of methyl ethers of tropolones that may be prepared according to the present invention include:

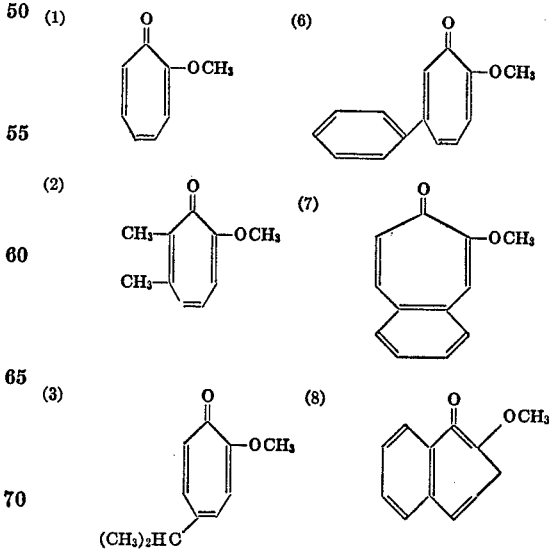

(4) 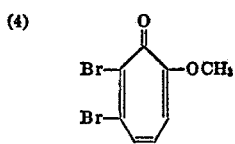

(5) 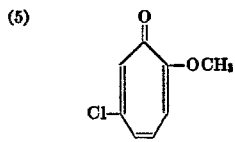

(9) 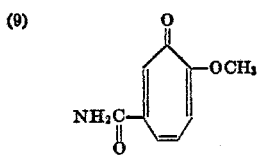

(10) 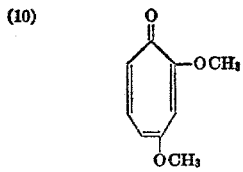

The following example is given to further illustrate the present invention and is not intended to limit the scope thereof.

EXAMPLE

Preparation of the compound of formula (1).

Tropolone (2-hydroxytropone) (4.9 g., 0.040 mole) was dissolved in 75 ml. of dry acetone in a 250 ml. round bottom flask fitted with a reflux condenser and drying tube; anhydrous potassium carbonate (5.5 g., 0.040 mole) was added followed directly by dimethyl sulfate (5.05 g., 0.040 mole) in one portion. The yellow reaction mixture was heated at reflux for two to three hours when conversion was shown to be complete by thin layer chromatography (silica gel eluted with 5% methanol in benzene). The cooled reaction mixture was filtered, and the solvent was removed under reduced pressure to give 5.2 g. (96% by weight) of a viscous pale yellow syrup which on prolonged standing could be induced to crystallize to give a beige solid, melting range, 39–40.5° C. Without further purification the 2-methoxytropone was homogenous by TLC and was identical (IR, NMR) to a sample prepared by reaction with diazomethane.

Since certain changes may be made in the above process without departing from the scope of the invention herein involved, it is intended that all matter contained in the above description shall be interpreted as illustrative and not in a limiting sense.

What is claimed is:

1. A process for converting 2-hydroxytropone to 2-methoxytropone which comprises refluxing 2-hydroxytropone with dimethyl sulfate in dry acetone in the presence of anhydrous potassium carbonate, said 2-hydroxytropone, dimethyl sulfate and potassium carbonate being employed in substantially equimolar quantities.

References Cited

Noller, "Chemistry of Organic Compounds" pp. 551–552, 943–44 (3rd Edition) (1965).

LEON ZITVER, Primary Examiner

G. A. SCHWARTZ, Assistant Examiner

U.S. Cl. X.R.

260—557 R